United States Patent
Takatani et al.

(10) Patent No.: US 7,038,902 B2
(45) Date of Patent: May 2, 2006

(54) SOLID ELECTROLYTIC CAPACITOR AND A FABRICATION METHOD THEREFOR

(75) Inventors: Kazuhiro Takatani, Takatsuki (JP);
Mutsumi Yano, Hirakata (JP);
Mamoru Kimoto, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/032,081

(22) Filed: Jan. 11, 2005

(65) Prior Publication Data
US 2005/0219803 A1 Oct. 6, 2005

(30) Foreign Application Priority Data
Mar. 31, 2004 (JP) ............................. 2004-104842

(51) Int. Cl.
*H01G 4/06* (2006.01)
(52) U.S. Cl. ..................... 361/524; 361/508; 29/25.03
(58) Field of Classification Search ............... 361/524, 361/525, 516, 532, 520, 540, 311; 29/25.03
See application file for complete search history.

(56) References Cited

U.S. PATENT DOCUMENTS

| | | | | |
|---|---|---|---|---|
| 5,103,371 A | * | 4/1992 | Ogawa et al. | 361/323 |
| 5,621,608 A | * | 4/1997 | Arai et al. | 361/525 |
| 5,729,428 A | * | 3/1998 | Sakata et al. | 361/523 |
| 6,229,689 B1 | * | 5/2001 | Kobayashi et al. | 361/525 |
| 6,430,033 B1 | * | 8/2002 | Mitsui et al. | 361/525 |
| 6,552,896 B1 | * | 4/2003 | Igaki et al. | 361/523 |
| 6,594,141 B1 | * | 7/2003 | Takada | 361/523 |

FOREIGN PATENT DOCUMENTS

JP  10-135080  5/1998

* cited by examiner

*Primary Examiner*—Anthony Dinkins
(74) *Attorney, Agent, or Firm*—McDermott Will & Emery LLP

(57) ABSTRACT

A solid electrolytic capacitor is provided with: an anode employing tantalum; a dielectric layer formed on said anode; and a cathode layer formed on said dielectric layer. The dielectric layer contains tantalum oxide and fluorine.

6 Claims, 1 Drawing Sheet

SOLID ELECTROLYTIC CAPACITOR AND A FABRICATION METHOD THEREFOR

RELATED APPLICATION

The priority application(s) Number(s) Japanese Patent Application No. 2004-104842 upon which this patent application is based is hereby incorporated by reference.

BACKGROUND OF THE INVENTION

1. Field of the Invention

The present invention relates to a solid electrolytic capacitor and a fabrication method therefor.

2. Description of the Related Art

Solid electrolytic capacitors provided with a dielectric layer of tantalum oxide prepared by anodizing a substrate of tantalum as an anode so as to form tantalum oxide thereon have been well known.

In the above-mentioned solid electrolytic capacitors, however, there has remained a problem that an equivalent series resistance (ESR) thereof is high.

In this connection, JP-A-10-135080 proposes formation of an electrolyte layer of manganese dioxide or the electrolyte layer of conducting polymer including polypyrrole and polyaniline between the dielectric layer and a cathode layer.

In the solid electrolytic capacitors provided with the electrolyte layer between the dielectric layer and the cathode layer, however, there has remained the problem that the equivalent series resistance in high frequency regions of around 100 kHz is not decreased sufficiently.

SUMMARY OF THE INVENTION

A first object of the present invention is to provide a solid electrolytic capacitor featuring a decreased equivalent series resistance.

Another object of the present invention is to provide a fabrication method of the solid electrolytic capacitor featuring the decreased equivalent series resistance.

A solid electrolytic capacitor according to the present invention is provided with: an anode employing tantalum; a dielectric layer formed on said anode, which comprises tantalum oxide containing fluorine; and a cathode layer formed on said dielectric layer.

When the dielectric layer of tantalum oxide contains fluorine as in the solid electrolytic capacitor of the present invention, dielectric loss is controlled for the effect of fluorine so that the solid electrolytic capacitor featuring the decreased equivalent series resistance is provided.

In the above-mentioned solid electrolytic capacitor, when amount of fluorine contained in the dielectric layer is insufficient, decrease of the equivalent series resistance of the solid electrolytic capacitor is insufficient. On the other hand, when the amount of fluorine contained in the dielectric layer is excessive, a surface of the anode dissolves excessively for the effect of fluoride ion during anodic oxidation of the anode employing tantalum in an aqueous solution containing fluoride ion so that uneven shapes formed on the surface become too large, as a result, the upper part of the dielectric layer is not uniformly covered with the cathode layer and contact resistance in an interface between the dielectric layer and the cathode layer increases, consequently, the equivalent series resistance of the solid electrolytic capacitor is not sufficiently decreased. Therefore, concentration of fluorine contained in the dielectric layer is preferably in a range of 0.01 wt % to 1.0 wt %, more preferably, in the range of 0.02 wt % to 0.75 wt % and, the most preferably, in the range of 0.1 wt % to 0.5 wt %.

A fabrication method of a solid electrolytic capacitor of the present invention comprises steps of: anodizing an anode employing tantalum in an aqueous solution containing fluoride ion to form a dielectric layer of tantalum oxide containing fluorine on the anode; and forming a cathode layer on said dielectric layer.

When the anode employing tantalum is anodically oxidized in the aqueous solution containing fluoride ion to form the dielectric layer of tantalum oxide containing fluorine on the anode, dielectric loss is controlled and equivalent series resistance decreases.

In addition, owing to the anodic oxidation of the anode in the aqueous solution containing fluoride ion, a surface of the anode employing tantalum dissolves in such a manner as to have uneven shapes for the effect of fluoride ion so that surface area of the anode increases. Consequently, contact area of an interface between the anode and the dielectric layer increases and contact resistance between the anode and the dielectric layer decreases. Thus, the equivalent series resistance in high frequency regions decreases.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

Hereinafter, preferred embodiments of the present invention will specifically be described based on the attached figures. It is to be noted that the present invention should not be limited to the following examples thereof and suitable changes and modifications may be made thereto within the scope of the invention.

Figure 1:
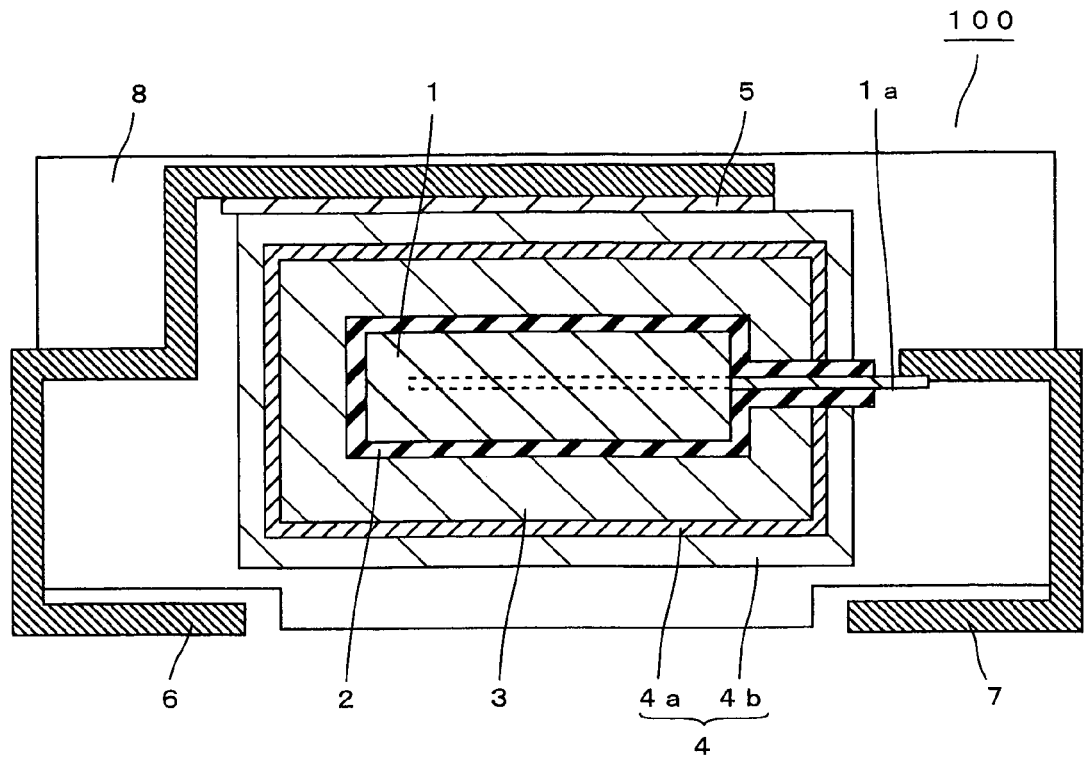
FIG. 1 is a structural cross-sectional view of a solid electrolytic capacitor of an embodiment of the present invention.

FIG. 1 is a structural cross-sectional view of a solid electrolytic capacitor of an embodiment of the present invention.

In a solid electrolytic capacitor 100 of the embodiment, as shown in FIG. 1, a dielectric layer 2 of tantalum oxide containing fluorine is formed on a surface of a plate-shaped anode of a porous sintered body prepared by sintering and molding tantalum particles around an anode lead 1*a* in a vacuum environment.

An electrolyte layer 3 is formed on the dielectric layer 2. The electrolyte layer 3 comprises manganese dioxide or conducting polymer including polypyrrole and polyaniline.

A cathode layer 4 is formed on the electrolyte layer 3. The cathode layer 4 comprises a first conductive layer 4*a* of carbon paste or the like formed on the electrolyte layer 3 and a second conductive layer 4*b* of silver paste or the like formed on the first conductive layer 4*a*.

A cathode terminal 6 is installed on the cathode layer 4 by conductive adhesive 5 and an anode terminal 7 is installed to an anode lead 1*a* of said anode 1.

One end of the anode terminal 7 and that of the cathode terminal 6 are thrust outside a mold outer resin 8.

A fabrication method of the solid electrolytic capacitor will be specified hereinafter.

Tantalum particles are sintered and molded around the anode lead 1a in the vacuum environment to obtain a plate-shaped anode 1 of a porous sintered body prepared by welding the tantalum particles.

Next, the anode 1 is anodically oxidized in an aqueous solution containing fluoride ion including ammonium fluoride aqueous solution to form the dielectric layer 2 of tantalum oxide containing fluorine on the anode 1.

In addition, an electrolyte layer 3 of manganese dioxide or conducting polymer including polypyrrole and polythiophene is formed on the dielectric layer 2. Various polymerization processes can be applied to form the electrolyte layer 3 of the conducting polymer whereas pyrolysis can be applied to form the electrolyte layer 3 of manganese dioxide. When the electrolyte layer 3 is formed on the dielectric layer 2 by the above-mentioned manner, the electrolyte layer 3 fills up chinks of the dielectric layer 2 on the surface of the porous sintered body as the anode 1.

Moreover, the first conductive layer 4a is formed by applying carbon paste or the like on the electrolyte layer 3 and the second conductive layer 4b is formed by applying silver paste or the like on the first conductive layer 4a so as to form the cathode layer 4 comprising the first conductive layer 4a and the second conductive layer 4b.

The cathode terminal 6 is installed on the cathode layer 4 by the conductive adhesive 5 and the anode terminal 7 is installed to the anode lead 1a salient from the dielectric layer 2, the electrolyte layer 3, and the cathode layer 4. Furthermore, one end of the anode terminal 7 and that of the cathode terminal 6 are thrust outside the mold outer resin 8.

In the solid electrolytic capacitor 100 of the embodiment, the dielectric layer 2 of tantalum oxide formed on the anode 1 contains fluorine. Therefore, dielectric loss of the dielectric layer 2 is controlled for the effect of fluorine so that equivalent series resistance of the solid electrolytic capacitor 100 decreases.

In the embodiment, the anode 1 of tantalum is anodically oxidized in the aqueous solution containing fluoride ion, therefore, the surface of the anode 1 of tantalum dissolves in such a manner as to have the uneven shapes for the effect of fluoride ion so that surface area of the anode increases. As a result, contact area of an interface between the anode 1 and the dielectric layer 2 increases so that the contact resistance between the anode 1 and the dielectric layer 2 decreases. Thus, the solid electrolytic capacitor featuring the decreased equivalent series resistance is easily fabricated.

In the embodiment, there was used the plate-shaped anode 1 of the porous sintered body. The anode 1, however, is not limited to said shape but may be a rod-shaped anode or a foil-shaped anode.

In addition, in the embodiment, the electrolyte layer 3 is formed between the dielectric layer 2 and the cathode layer 4. The formation of the electrolyte layer 3, however, may be omitted and the cathode layer 4 may directly be formed on the dielectric layer 2.

Hereinafter, a solid electrolytic capacitor of examples of the present invention will specifically be described while comparative examples will be cited to demonstrate that examples of the inventive electrolytic capacitor notably decrease the equivalent series resistance.

EXAMPLE 1

Figure 2:
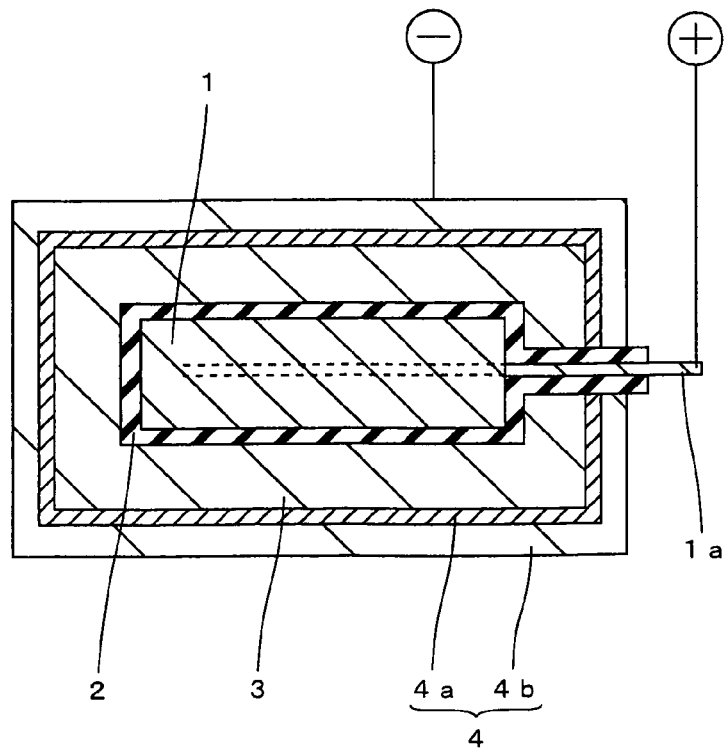
FIG. 2 is an illustration showing a structure and an evaluation method of a solid electrolytic capacitor of Example 1 of the present invention.

FIG. 2 is an illustration showing a structure and an evaluation method of a solid electrolytic capacitor of Example 1 of the present invention.

In fabrication of the solid electrolytic capacitor of Example 1, tantalum particles of about 99% of purity were sintered and molded on an anode lead 1a in a vacuum environment to form an anode 1 of plate-shaped tantalum porous sintered body about 4 mm long, 4 mm wide, and about 500 μm thick.

Next, the anode 1 was anodically oxidized at a constant voltage of about 15 V in an aqueous solution containing about 0.1 wt % of ammonium fluoride (concentration of fluoride ion: about 0.05 wt %) at about 60° C. for about 10 hours to form a dielectric layer 2 of tantalum oxide having thickness of about 30 nm on the anode 1.

The amount of fluorine contained in the dielectric layer 2 was analyzed by ESCA (Electron Spectroscopy for Chemical Analysis). As a result, concentration of fluorine in the dielectric layer 2 was about 0.1 wt %.

Moreover, an electrolyte layer 3 of polypyrrole was formed on the dielectric layer 2 by electrolytic polymerization. Furthermore, carbon paste was applied on the electrolyte layer 3 to form a first conductive layer 4a and silver paste was applied on the first conductive layer 4a to form a second conductive layer 4b so as to form the cathode layer 4 comprising the first conductive layer 4a and the second conductive layer 4b on the electrolyte layer 3. Thus was fabricated the solid electrolytic capacitor A of Example 1.

COMPARATIVE EXAMPLE 1

In comparative example 1, in the anodic oxidation of the anode 1, the aqueous solution containing about 0.1 wt % of nitric acid was used in place of the aqueous solution containing about 0.1 wt % of ammonium fluoride used in Example 1. Except for the above, the same procedure as that in Example 1 was used to fabricate the solid electrolytic capacitor X. In the solid electrolytic capacitor X of comparative example 1, the dielectric layer 2 of tantalum oxide formed on the anode 1 did not contain fluorine.

Voltage was applied between the anode and the cathode layer of each of the solid electrolytic capacitors of Example 1 and comparative examples 1 to determine an equivalent series resistance (ESR) in frequency modulation of about 100 kHz by means of an LCR meter. The index number of ESR was determined on the basis of ESR of comparative example 1 defined as 100. The results are listed in Table 1 as below.

TABLE 1

|  | ESR |
| --- | --- |
| solid electrolytic capacitor A | 60 |
| solid electrolytic capacitor X | 100 |

As is apparent from the results, ESR of the solid electrolytic capacitor A of Example 1 decreased to about 60% of ESR of the solid electrolytic capacitor X of comparative example 1. Therefore, it was confirmed that ESR decreases when the dielectric layer 2 contains fluorine.

In addition, in formation of the dielectric layer 2 in Example 1, the anode 1 of tantalum was anodically oxidized in the aqueous solution containing fluoride ion, therefore, it is expected that the surface of the anode 1 of tantalum dissolved in such a manner as to have uneven shapes for the effect of fluoride ion contained in the aqueous solution. As a result, it is expected that surface area of the anode 1 increased and contact area of an interface between the anode 1 and the dielectric layer 2 increased so that contact resistance between the anode 1 and the dielectric layer 2 further decreased.

EXAMPLE 2

In Example 2, relation between concentration of fluorine contained in the dielectric layer 2 and ESR was examined.

In Example 2, in the anodic oxidation of the anode 1 of tantalum, the aqueous solutions respectively containing about 0.006 wt %, about 0.01 wt %, about 0.02 wt %, about 0.05 wt %, about 0.5 wt %, about 0.75 wt %, about 1.0 wt %, and about 1.2 wt % of ammonium fluoride were used in place of the aqueous solution containing about 0.1 wt % of ammonium fluoride used in Example 1. Except for the above, the same procedure as that in Example 1 was used to fabricate the solid electrolytic capacitors B1 to B8.

The amount of fluorine contained in the dielectric layer of each of the solid electrolytic capacitors B1 to B8 was analyzed by ESCA in the same manner as in Example 1. As a result, the amount of fluorine contained in the dielectric layer was respectively about 0.005 wt % in the solid electrolytic capacitor B1, about 0.01 wt % in the solid electrolytic capacitor B2, about 0.02 wt % in the solid electrolytic capacitor B3, about 0.05 wt % in the solid electrolytic capacitor B4, about 0.5 wt % in the solid electrolytic capacitor B5, about 0.75 wt % in the solid electrolytic capacitor B6, about 1.0 wt % in the solid electrolytic capacitor B7, and about 1.2 wt % in the solid electrolytic capacitor B8 as shown in Table 2.

In the same manner as in Example 1, ESR of the solid electrolytic capacitors B1 to B8 was determined. The index number of ESR of each of the solid electrolytic capacitors B1 to B8 was determined on the basis of ESR of the solid electrolytic capacitor of comparative example 1 defined as 100. The results are listed in Table 2 as below.

TABLE 2

|  | content of fluorine (wt %) | ESR |
|---|---|---|
| solid electrolytic capacitor B1 | 0.005 | 90 |
| solid electrolytic capacitor B2 | 0.01 | 66 |
| solid electrolytic capacitor B3 | 0.02 | 62 |
| solid electrolytic capacitor B4 | 0.05 | 62 |
| solid electrolytic capacitor A | 0.1 | 60 |
| solid electrolytic capacitor B5 | 0.5 | 58 |
| solid electrolytic capacitor B6 | 0.75 | 61 |
| solid electrolytic capacitor B7 | 1.0 | 66 |
| solid electrolytic capacitor B8 | 1.2 | 84 |

As is apparent from the results, ESR of each of the solid electrolytic capacitors B1 to B8 of Example 2 decreased compared with the solid electrolytic capacitor X of comparative example 1.

In addition, it was confirmed that both an insufficient concentration of fluorine in the dielectric layer and an excessive concentration of fluorine in the dielectric layer result in tendency toward increase of ESR. Therefore, it was confirmed that the concentration of fluorine in the dielectric layer is preferably in a range of 0.01 wt % to 1.0 wt %, more preferably, in the range of 0.02 wt % to 0.75 wt % and, the most preferably, in the range of 0.1 wt % to 0.5 wt %.

EXAMPLE 3

In Example 3, influence caused by changes of the aqueous solution used in the anodic oxidation of the anode 1 of tantalum was examined.

In Example 3, the aqueous solution containing about 0.16 wt % of potassium fluoride, the aqueous solution containing about 0.11 wt % of sodium fluoride, and the aqueous solution containing about 0.05 wt % of hydrofluoric acid were respectively used in place of the aqueous solution containing about 0.1 wt % of ammonium fluoride used in Example 1. Except for the above, the same procedure as that in Example 1 was used to fabricate the solid electrolytic capacitors C1 to C3. The concentration of fluorine in each of the aqueous solutions was about 0.05 wt %.

The amount of fluorine contained in the dielectric layer of each of the solid electrolytic capacitors C1 to C3 was analyzed by ESCA in the same manner as in Example 1. As a result, the concentration of fluorine in each of the dielectric layer of the solid electrolytic capacitors C1 to C3 was about 0.1 wt %.

In the same manner as in Example 1, ESR of the solid electrolytic capacitors C1 to C3 was determined. The index number of ESR of each of the solid electrolytic capacitors C1 to C3 was determined on the basis of ESR of the solid electrolytic capacitor of comparative example 1 defined as 100. The results are listed in Table 3 as below.

TABLE 3

|  | ESR |
|---|---|
| solid electrolytic capacitor C1 | 60 |
| solid electrolytic capacitor C2 | 60 |
| solid electrolytic capacitor C3 | 60 |
| solid electrolytic capacitor A | 60 |

As is apparent from the results, ESR of each of the solid electrolytic capacitors C1 to C3 of Example 3 decreased compared with the solid electrolytic capacitor X of comparative example 1 so that the solid electrolytic capacitors C1 to C3 had the same degree of characteristics as that of the solid electrolytic capacitor A of Example 1.

Therefore, it was confirmed that that the use of the potassium fluoride aqueous solution, the sodium fluoride aqueous solution, and the hydrofluoric acid aqueous solution in place of the ammonium fluoride aqueous solution results in the decrease of ESR.

Although the present invention has been fully described by way of examples, it is to be noted that various changes and modifications will be apparent to those skilled in the art.

Therefore, unless otherwise such changes and modifications depart from the scope of the invention, they should be construed as being included therein.

The invention claimed is:

1. A solid electrolytic capacitor provided with: an anode employing tantalum;
   a dielectric layer formed on said anode, which comprises tantalum oxide containing fluorine;
   and a cathode layer formed on said dielectric layer, wherein
   concentration of fluorine in said dielectric layer is in a range of 0.01 wt % to 1.0 wt %.

2. The solid electrolytic capacitor as claimed in claim 1, wherein
   the concentration of fluorine in said dielectric layer is in the range of 0.02 wt % to 0.75 wt %.

3. The solid electrolytic capacitor as claimed in claim 1, wherein
the concentration of fluorine in said dielectric layer is in the range of 0.1 wt % to 0.5 wt %.

4. The solid electrolytic capacitor as claimed in claim 1, wherein
an electrolyte layer is formed between said dielectric layer and the cathode layer.

5. A fabrication method of a solid electrolytic capacitor comprising steps of:
anodizing an anode employing tantalum in an aqueous solution containing fluoride ion to form a dielectric layer of tantalum oxide containing fluorine on the anode; and
forming a cathode layer on said dielectric layer.

6. A fabrication method of a solid electrolytic capacitor comprising steps of:
anodizing an anode employing tantalum in an aqueous solution containing fluoride ion to form a dielectric layer of tantalum oxide containing fluorine on the anode;
forming an electrolyte layer on said dielectric layer; and
forming a cathode layer on said electrolyte layer.

* * * * *